United States Patent

Rayes et al.

[11] Patent Number: 5,787,161
[45] Date of Patent: Jul. 28, 1998

[54] NETWORK DESIGNER FOR COMMUNICATION NETWORKS

[75] Inventors: Ammar Rayes, Franklin Park, N.J.; Paul Seungkyu Min, St. Louis, Mo.

[73] Assignee: Bell Communications Research, Inc., Morristown, N.J.

[21] Appl. No.: 555,955

[22] Filed: Nov. 13, 1995

[51] Int. Cl.[6] ..................................................... H04M 3/36
[52] U.S. Cl. ........................... 379/221; 379/220; 379/113
[58] Field of Search ..................................... 379/113, 219, 379/220, 221; 370/351, 400, 465, 468, 232, 233

[56] References Cited

U.S. PATENT DOCUMENTS

| | | | |
|---|---|---|---|
| 4,931,941 | 6/1990 | Krishnan | 379/220 |
| 5,381,404 | 1/1995 | Sugano et al. | 370/400 |
| 5,475,615 | 12/1995 | Lin | 370/233 |
| 5,519,836 | 5/1996 | Gawlick et al. | 379/220 |

OTHER PUBLICATIONS

M.V. Hegde et al., "State Dependent Routing: Traffic Dynamics and Performance Benefits," Journal of Network and Systems Management, vol. 2, No. 2, 1994, pp. 125–149.

*Primary Examiner*—Ahmad F. Matar
*Attorney, Agent, or Firm*—Joseph Giordano; David A. Hey; Lori B. Yeadon

[57] ABSTRACT

In communication network, the network blocking probability can be efficiently calculated by applying a Gaussian approximation to a fixed point algorithm. Gaussian curves are approximated to represent state probability distributions of the network links. By efficiently calculating the network blocking probability, the network can be optimally designed by lowering the network blocking probability below a threshold at the least cost.

14 Claims, 4 Drawing Sheets

NETWORK DESIGNER FOR COMMUNICATION NETWORKS

BACKGROUND OF THE INVENTION

1. Field of the Invention

The present invention relates to capacity expansion in communication networks. More particularly, the present invention relates to methods and apparatuses for efficiently calculating the blocking probability in a communication network to provide optimal network design.

2. Description of the Related Art

Various techniques are known for routing calls or messages through communication networks. For instance, switches, known as nodes, located throughout a geographic region may be connected by links to form a telephone network. Each link is made up of one or more circuits. When a calling party places a telephone call to a receiving party, the telephone network routes the call onto available circuits of selected links in accordance with a routing scheme.

One conventional routing technique is known as the "Least Busy Alternate Routing scheme," a type of adaptive state dependent routing scheme. Under this scheme, an arrived call is carried on the direct (one-link) path between the originating and terminating nodes. If the direct path is busy or does not exist, the network analyzes several possible paths connecting the calling party to the receiving party. The network assigns, for each path, a "state" value corresponding to the number of calls carried by the busiest link in the path. The network selects the path with the lowest state value and routes the call through that path.

The number of calls that the network can handle is based upon the number of circuits in the network. Calls placed when the network's circuits are busy are not completed, or "blocked." The likelihood that the network will not be able to complete a call, the "network blocking probability," is related to the number of calls received by the network, the number of circuits in the network, the network configuration, and the routing scheme used by the network. Given the network configurations and a routing scheme, the goal of solving a capacity expansion problem is to determine the optimal method of designing (or dimensioning) the network to carry the expected demand of calls so that the network blocking probability is less than a prespecified threshold. In addition, when a network blocking probability exceeds a threshold, additional circuits may need to be added to the network to increase the-network's capacity.

A technique known as "shadow pricing" can be used to determine how to optimally design the network. Shadow pricing with respect to the present invention involves comparing the cost of adding circuits to each link so as to lower the network blocking probability below the threshold. Then, the circuits whose addition is associated with the lowest cost is added to the appropriate link to lower the blocking probability to acceptable levels.

For some routing schemes, however, determining the network blocking probability is impractical. For example, when the Least Busy Alternate Routing scheme is used, the network blocking probability can be calculated using the "fixed point algorithm." The fixed point algorithm is described by M. V. Hedge et al., "State Dependent Routing: Traffic Dynamics and Performance Benefits," Journal of Network and Systems Management, Vol. 2, No. 2, p. 125–149 (1994), the contents of which are hereby incorporated by reference. Because calculations using the fixed point algorithm are extremely time and processor intensive, the fixed point algorithm cannot be used practically. Accordingly, it is desirable to efficiently calculate network blocking probability to provide optimal design of a communications network that uses adaptive state dependent routing, such as the Least Busy Alternate Routing scheme.

SUMMARY OF INVENTION

Accordingly, the present invention is directed to a method and apparatus that substantially obviate one or more of the problems due to limitations and disadvantages of the related art.

It is an object of the invention to efficiently calculate the network blocking probability in a communication network.

It is another object to provide optimal design of a communication network that uses adaptive state dependent routing, such as the Least Busy Alternate Routing scheme.

To achieve these and other advantages and in accordance with the purpose of the invention, as embodied and broadly described, the invention includes a method of determining a network blocking probability in a communication network, the communication network comprising N nodes connected by L links. The method comprises the steps of determining rates of call arrival for respective links, estimating state probability distributions for respective links using the respective rates of call arrival and approximations based upon a continuous probability function, and calculating a path assignment probability that an arrived call is assigned to a particular path based upon the estimated state probability distribution.

In another aspect, the invention includes a method of optimally designing and/or expanding network capacity so that the overall network blocking probability falls below a predetermined threshold. The network comprises N nodes connected by L links and uses an adaptive state dependent routing scheme. Each link comprises at least one circuit. The method comprises the steps of determining a plurality of circuit combinations, each comprising at least one circuit, each of whose addition to the network would lower a network blocking probability below a predetermined threshold, determining the cost of adding each circuit combination to the network, and determining which one of the plurality of circuit combinations is associated with the lowest cost.

In a further aspect, the invention includes an apparatus for determining a network blocking probability in a communication network, the communication network comprising N nodes connected by L links. The apparatus comprises means for determining rates of call arrival for respective links, means for estimating state probability distributions for respective links using the respective rates of call arrival and approximations based upon a continuous probability function, and means for calculating path assignment probabilities based upon the estimated state probability distribution.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate several embodiments of the invention, and, together with the description, serve to explain the principles of the invention.

In the drawings.

DETAILED DESCRIPTION

In accordance with the invention, an apparatus efficiently calculates the network blocking probability by applying a Gaussian approximation to a fixed point algorithm. The apparatus uses Gaussian curves to approximate to state probability distributions of network links. In this way, network blocking probabilities can be calculated many times faster than using the traditional fixed point algorithm. By efficiently calculating the network blocking probability, the capacity of networks using adaptive state dependent routing schemes, such as the Least Busy Alternative Routing scheme, can be optimally expanded.

Figure 1:
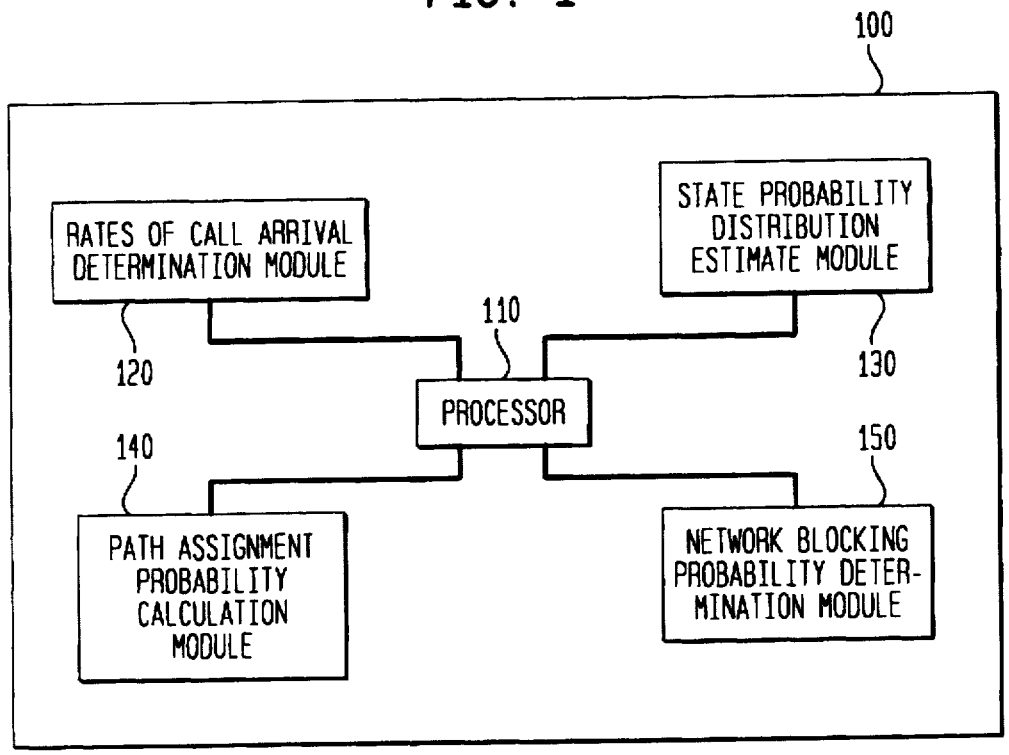
FIG. 1 illustrates a block diagram of an apparatus for determining network blocking probability, in accordance with a preferred embodiment of the invention.

FIG. 1 shows a block diagram of apparatus 100 in accordance with a preferred embodiment of the invention. Apparatus 100 efficiently determines network blocking probability. In FIG. 1, modules 120, 130, 140, and 150 are connected to processor 110 and cause processor 110 to perform the functions described herein. Processor 110 is preferably any conventional processor capable of performing the described functionality.

Module 120 determines the rates of call arrival for respective origin-destination nodes in the network. Preferably, these rates are known and can be readily obtained by module 120, either by user input or by accessing a memory storing the rates or a forecasting system.

Module 130 estimates state probability distributions for respective links using respective rates of call arrival obtained by module 120 and using approximations to the fixed point algorithm based upon a continuous probability function. As described above, the continuous probability function is preferably a Gaussian distribution. Module 130 preferably estimates the state probability distributions using the method described in connection with FIG. 3 or FIG. 4.

Module 140 calculates a path assignment probability that an arrived call is assigned to a particular path using the state probability distribution estimated by module 130. Finally, using the path assignment blocking probabilities, module 150 determines the network blocking probability.

Although apparatus 100 is described as being implemented using software, apparatus 100 can alternatively be implemented using discrete logic circuitry or any other non-software implementation, in accordance with conventional techniques.

Figure 2:
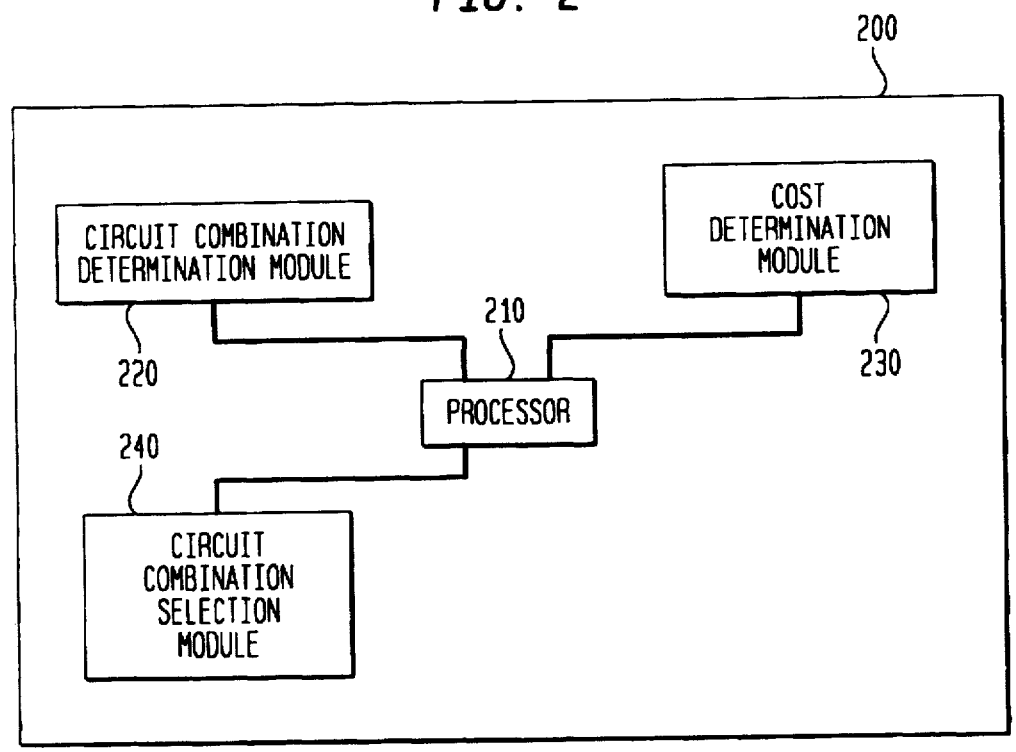
FIG. 2 illustrates a block diagram of an apparatus for designing and/or expanding a communication network using network blocking probability, in accordance with the invention.

Once apparatus 100 has determined the network blocking probability, apparatus 200, shown as a block diagram in FIG. 2, can optimally design and/or expand the network using the network blocking probability determined by apparatus 100. Apparatus 200 includes processor 210 and modules 220, 230, and 240 connected to processor 210. Processor 210 is preferably any conventional processor capable of performing the described functionality.

Module 220 determines different combinations of circuits capable of reducing the network blocking probability below a predetermined threshold. In one embodiment, module 220 simulates the addition of circuits as different links of the network and calculates the network blocking probability for each simulated addition. If module 220 determines that adding certain circuit(s) would not reduce the network blocking probability below the threshold, module 220 adds additional circuit(s) until the network blocking probability would be reduced below the threshold.

Module 230 determines the cost of adding to the network circuits corresponding to each combination determined by module 220. Module 240 selects the combination of circuits determined by module 220 that would entail the lowest cost if added to the network. Accordingly, apparatus 200 provides optimal design and/or expansion of communication networks.

As described in one embodiment, apparatus 100 and apparatus 200 are implemented separately, where apparatus 100 calculates the network blocking probability and apparatus 200 uses the network blocking probability to optimally design and/or expand a communication network. In alternative embodiments, the modules of apparatus 100 and apparatus 200 can be implemented in a single apparatus or multiple apparatuses.

Figure 3:
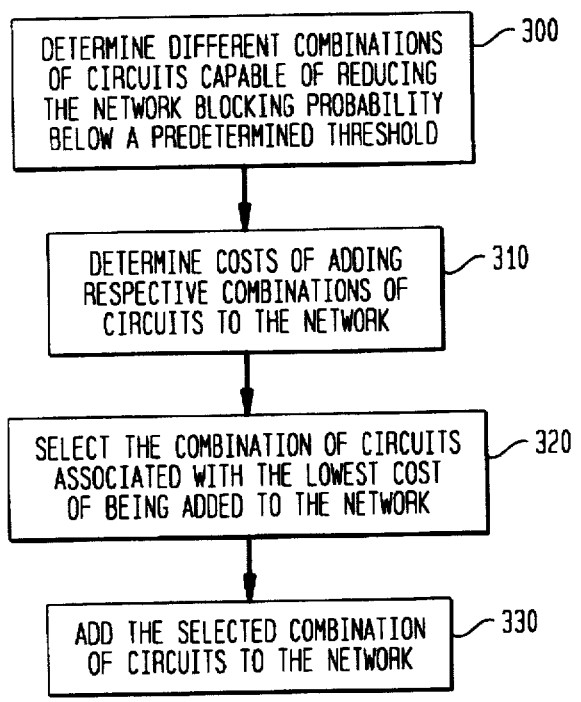
FIG. 3 illustrates a flow diagram of a method of designing and/or expanding a communication network, in accordance with the invention.

FIG. 3 shows a flow diagram of a method of designing and/or expanding a communication network using the network blocking probability, in accordance with a preferred embodiment of the invention. The method shown in FIG. 3 is preferably carried out by an apparatus, such as apparatus 200.

To begin, apparatus 200 determines different combinations of circuits capable of reducing the network blocking probability below a predetermined threshold (step 300). For example, in a telephone network, an acceptable threshold may be 1%. If the network blocking probability exceeds 1%, apparatus 200 determines the number of circuits required to bring the blocking probability below 1% for each link in the network.

Apparatus 200 determines the cost of adding a circuit combination to the network for each combination determined in step 300 (step 310). Apparatus 200 then selects the combination whose addition to the network yields the lowest cost (step 320). Once apparatus 200 selects a combination of circuits that would reduce the network blocking probability below a predetermined threshold at minimal cost, that combination of circuits can be added to the network (step 330).

Figure 4:
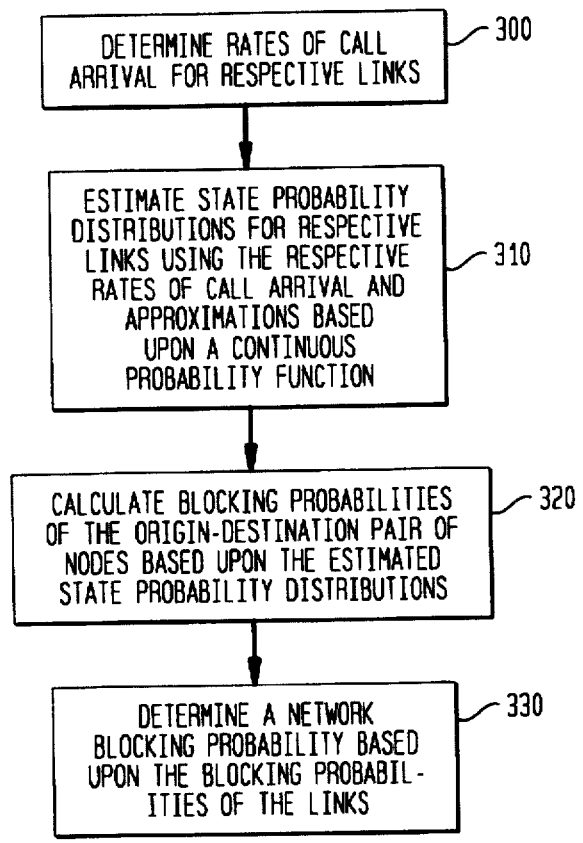
FIG. 4 illustrates a flow diagram of a method of determining network blocking probability, in accordance with the invention.

In the past, however, step 300 was not feasible where the network used, for example, a state dependent routing scheme, such as the Least Busy Alternative Routing scheme. FIG. 4 shows a flowchart of a method of calculating the blocking probability in such a network efficiently, in accordance with one embodiment of the invention, so that step 300 can be viably carried out. The method of FIG. 4 is preferably carried out by apparatus 100.

Under the method of FIG. 4, apparatus 100 determines rates of call arrival for respective links of the network (step 400). Apparatus 100 uses these rates of call arrival, along with approximations of the state probability distribution based upon a continuous probability function, to estimate state probability distributions for respective links (step 410). As described below, the continuous probability function is preferably a Gaussian distribution. Apparatus 100 calculates the blocking probabilities of the paths connecting an Origin-Destination pair of nodes based upon the estimated state probability distributions (step 420). Finally, apparatus 100 determines the network blocking probability based upon the blocking probabilities of the paths, which were calculated in step 420 (step 430).

In a preferred embodiment, the continuous probability function used to estimate the state probability distributions is a Gaussian distribution. It has been ascertained that Gaussian curves closely fit state probability distributions of communication networks, such as telephone networks. The main computational complexity in using a Gaussian curve to approximate the state probability function lies in determining the mean, $\mu$ and the standard deviation, $\sigma$. The invention provides two methods of determining values for $\mu$ and $\sigma$, corresponding to a Gaussian curve substantially matching the state probability distribution for the respective link.

Figure 5:
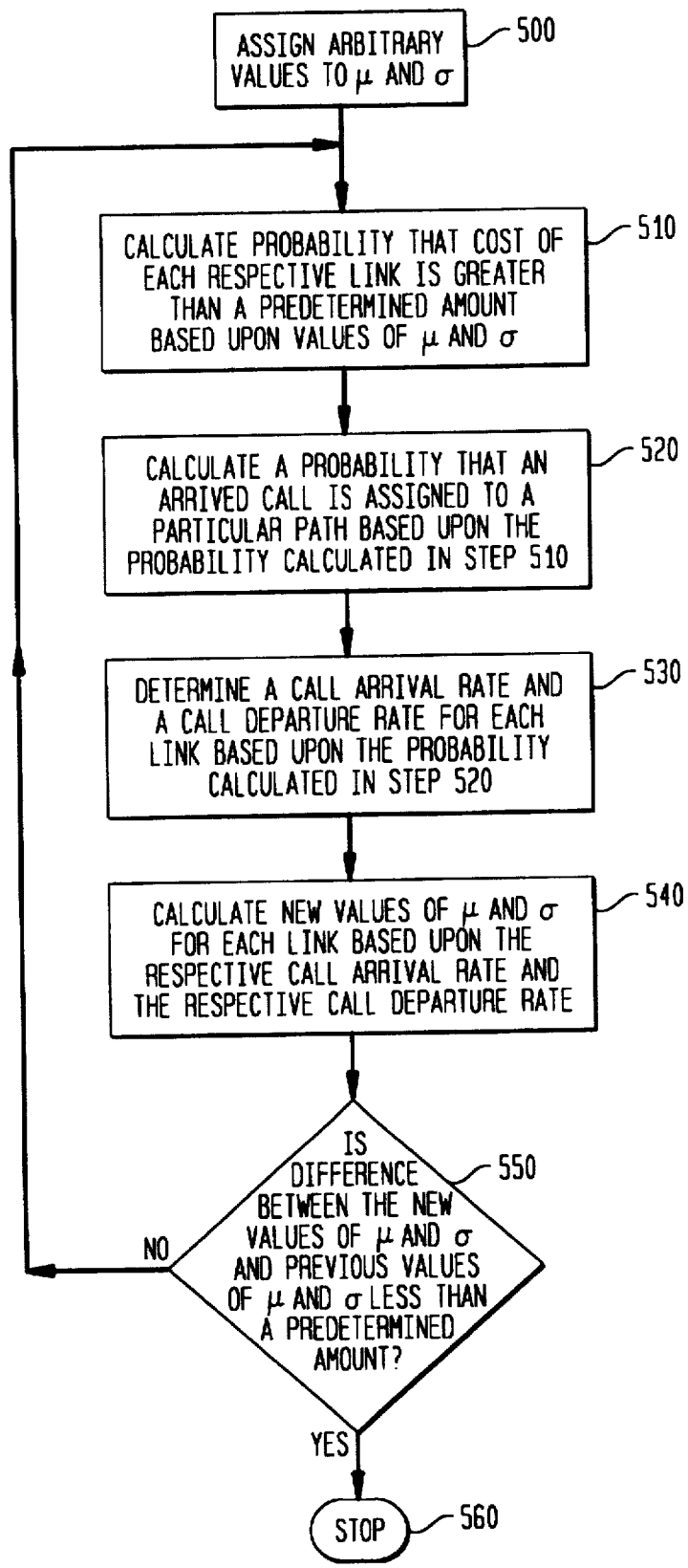
FIG. 5 illustrates a flow diagram of a method of determining values of $\mu$ and $\sigma$ corresponding to a Gaussian curve to estimate state probability distributions, in accordance with a first embodiment of the invention.

FIG. 5 shows a flowchart of a method of determining values for $\mu$ and $\sigma$ in accordance with a first embodiment of the invention. This method is preferably carried out by apparatus 100 and in particular module 130. To begin, apparatus 100 arbitrarily assigns initial values for $\mu$ and $\sigma$ (step 500) since the other steps are performed iteratively until the values for $\mu$ and $\sigma$ converge. Apparatus 100 calculates the probability that the state probability distribution of each respective link is greater than a predetermined amount based upon the values of $\mu$ and $\sigma$ (step 510). Apparatus 100 calculates the probability that an arrived call is assigned to a particular path based upon the probability calculated in step 510 (step 520). Apparatus 100 determines a call arrival rate and call departure rate for each link based upon the probability calculated in step 520 (step 530).

Apparatus 100 determines new values of $\mu$ and $\sigma$ for each link based upon the respective call arrival rate and respective call departure rate (step 540). Finally, apparatus 100 compares the new values of $\mu$ and $\sigma$ with the previous values. If the difference between these values is less than a predetermined amount (i.e. the values have converged), then the method stops (step 560). If, however, the difference is more than the predetermined amount, apparatus 100 repeats steps 510, 520, 530, and 540 (step 550).

Apparatus 100 preferably carries out step 510 according to the following equations:

$$H_{(i,j)}(x) = F_{(i,h)}(x) + F_{(h,j)}(x) - (F_{(i,h)}(x) * F_{(h,j)}(x))$$

$$F_{(i,j)}(x) = \frac{G((x - \mu(i,j))/\sigma(i,j)) - G((s(i,j) - \mu(i,j))/\sigma(i,j))}{G(-\mu(i,j)/\sigma(i,j)) - G((s(i,j) - \mu(i,j))/\sigma(i,j))}$$

$$G(x) = \frac{1}{(1 - a)x + a(x^2 + b)^{1/2}} * \frac{1}{(2\pi)^{1/2}} * e^{-x*x/2, for\ x \geq 0}$$

where H represents a probability that, the state probability distribution of a particular link is greater than a predetermined value; i represents an origin node; j represents a destination node; h represents an intermediate node; s(i,j) is the capacity of the link connecting nodes i and j; and a and b are constants.

Apparatus 100 preferably carries out step 520 according to the following equation:

$$\gamma_{(i,j)}(x,y) = \Pi H_{(i,j)}(Max(x,y)),$$

where $\gamma$ represents a probability that an arrived call is assigned to a particular path.

Figure 6:
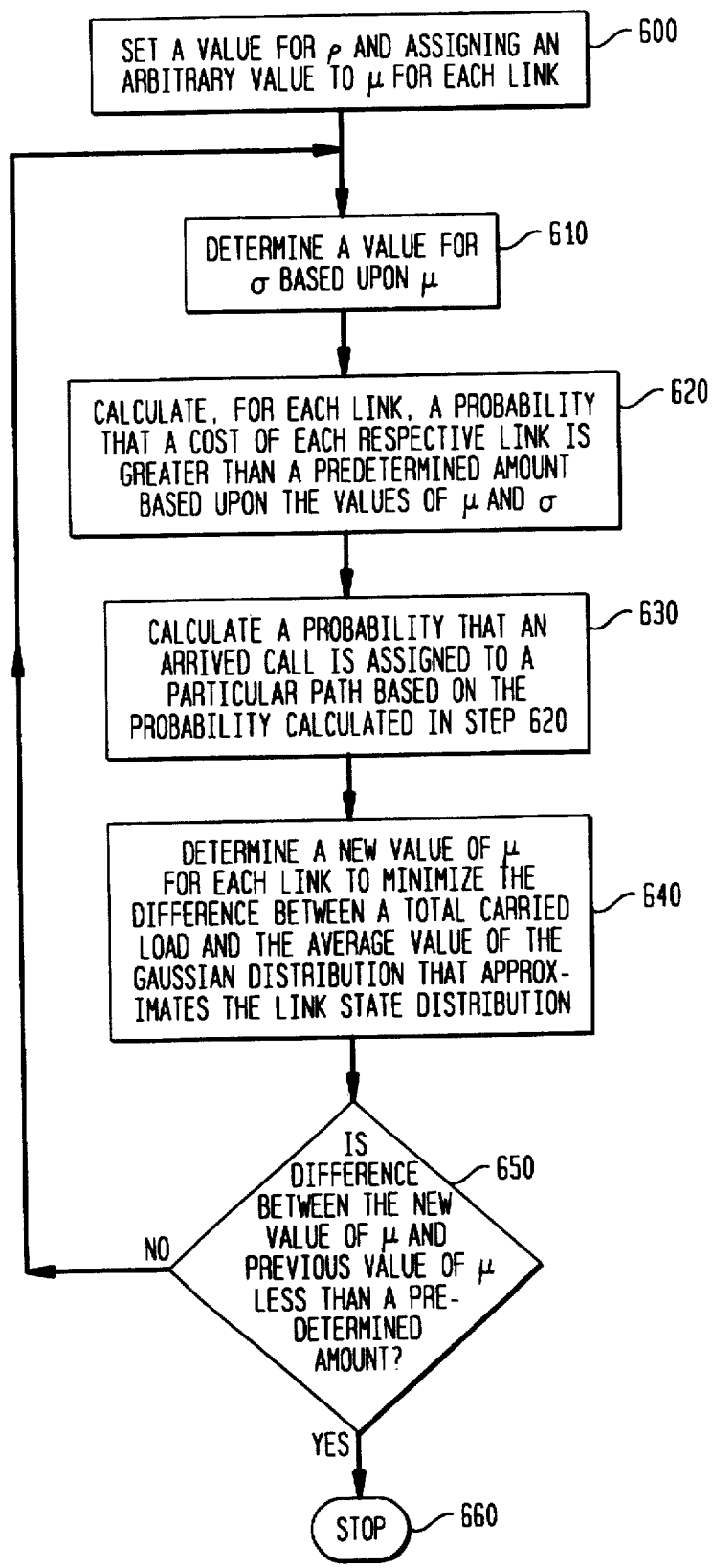
FIG. 6 illustrates a flow diagram of a method of determining values of $\mu$ and $\sigma$ corresponding to a Gaussian curve to estimate state probability distributions, in accordance with a second embodiment of the invention.

FIG. 6 shows a flowchart of a method of determining values for $\mu$ and $\sigma$ in accordance with a second embodiment of the in invention. This method can also be executed by apparatus 100 and in particular module 130. Apparatus 100 sets a value for p (step 600), which is preferably known. Apparatus 100 assigns an arbitrary value for $\mu$ for each link (step 600). Apparatus 100 determines a value for $\sigma$ based upon $\mu$ (step 610).

Apparatus 100 calculates a probability that a cost of each respective link is greater than a predetermined amount for each link based upon the values of $\mu$ and $\sigma$ (step 620). Apparatus 100 then calculates a probability that an arrived call is assigned to a particular path based upon the probability calculated in step 620 (step 630). In a preferred embodiment, apparatus 100 obtains the probabilities calculated in steps 620 and 630 in the same manner as the probabilities calculated in steps 510 and 520, shown in FIG. 5.

Apparatus 100 determines a new value of $\mu$ for each link to minimize the difference between a total carried load and the average value of the Gaussian distribution that approximate the state distribution for the link (step 640). Apparatus 100 compares the difference between the new value of $\mu$ and previous value of $\mu$ (step 650). If the difference is less than a predetermined amount, then the method stops (step 660). If the difference is not less than a predetermined amount, then apparatus 100 repeats steps 610, 620, 630, and 640 (step 660).

As described above, the methods of the invention are preferably implemented as software or microcode, in accordance with conventional programming techniques, executed on a processor. Alternatively, however, the methods can be implemented using any conventional implementation, including hardware, firmware, logic circuitry.

It will be apparent to those skilled in the art that various modifications and variations can be made in the method and apparatus of the present invention without departing from the spirit or scope of the invention. For example, while the embodiments described herein relate to long distance or local telephone networks, the principles of the invention can also be applied to other communication networks, such as broad band networks and wireless networks. Thus, it is intended that the present invention cover the modifications and variations of this invention provided they come within the scope of the appended claims and their equivalents.

We claim:

1. A method of determining a network blocking probability in a communication network, the communication network having nodes connected to each other by links, the links which interconnect the originating and terminating nodes defining a path, the method comprising the steps, executed by a processor, of:

determining the rates of call arrival for respective links;

estimating state probability distributions for respective links using said call arrival rates and based on approximations of said link state probability distributions to correspond to a continuous probability function;

calculating a path assignment probability that an arrived call is assigned to a particular path based upon the estimated state probability distributions; and determining the network blocking probability based upon the path assignment probability.

2. The method according to claim 1, wherein the step of estimating comprises:

determining, for each link, values of $\mu$ and $\sigma$ corresponding to a Gaussian curve substantially matching the state probability distribution for the respective link.

3. The method according to claim 2, wherein the step of determining values of μ and σ comprises:

(a) assigning arbitrary values to μ and σ;

(b) calculating a probability that the state probability distribution of each respective link is greater than a predetermined amount based on values of μ and σ;

(c) calculating a probability that an arrived call is assigned to a particular path based upon the probability calculated in step (b);

(d) determining a call arrival rate and a call departure rate for each link based upon the probability calculated in step (c);

(e) calculating new values of μ and σ for each link based upon the respective call arrival rate and the respective call departure rate;

(f) determining whether the difference between the new values of μ and σ and previous values of μ and σ is less than a predetermined amount; and (g) if the difference between the new values of μ and σ and previous values of μ and σ is not less than the predetermined amount, repeating steps (b)–(g).

4. The method according to claim 3, wherein the probability in step (b) is calculated in accordance with the following equations:

$$H_{[i,j]}(x) = F_{[i,h]}(x) + F_{[h,j]}(x) - (F_{[i,h]}(x) * F_{[h,j]}(x))$$

$$F_{[i,j]}(x) = \frac{G((x - \mu(i,j))/\sigma(i,j)) - G((s(i,j) - \mu(i,j))/\sigma(i,j))}{G(-\mu(i,j)/\sigma(i,j)) - G((s(i,j) - \mu(i,j))/\sigma(i,j))}$$

$$G(x) = \frac{1}{(1-a)x + a(x^2+b)^{1/2}} * \frac{1}{(2\pi)^{1/2}} * e^{-x^2/2} \quad x \geq 0$$

where H represents the probability that the state probability distribution of a particular link is greater than a predetermined value; i represents an origin node; j represents a destination node; h represents an intermediate node; and a and b are constants.

5. The method according to claim 4, wherein the probability calculated in step (c) is calculated in accordance with the following equation:

$$\gamma_{[i,j]}(x,y) = \Pi H_{[i,j](Max(x,y))},$$

where γ represents a probability that an arrived call is assigned to a particular path.

6. The method according to claim 2, wherein the step of determining values of μ and σ comprises:

(a) setting a value for ρ for each link;

(b) assigning an arbitrary value to μ for each link;

(c) determining the value of σ to be $(\mu*\rho)^{1/2}$ for respective links;

(d) calculating, for each link, a probability that a cost of each respective link is greater than a predetermined amount based upon the values of μ and σ;

(e) calculating a probability that an arrived call is assigned to a particular path based on the probability calculated in step (d);

(f) determining a new value of μ for each link to minimize the difference between a total carried load for the respective link and the average value of the Gaussian distribution that approximate the state distribution for the link;

(g) determining whether the difference between the new value of μ for each link and the previous value of μ is less than a predetermined amount; and (h) if the difference between the new value of μ and the previous value of μ is not less than the predetermined amount, repeating steps (c)–(h).

7. A method of adding circuits to a network to expand network capacity so that the overall network blocking probability falls below a predetermined threshold, the network having nodes connected to each other by links and using an adaptive state dependent routing scheme for routing calls on the links, each link having at least one circuit and the links which interconnect the originating and terminating nodes defining a path, the method comprising the steps, executed on a processor, of:

determining a plurality of circuit combinations, each of said circuit combinations having at least one circuit, so that the addition of each of said circuit combinations to the network may lower the network blocking probability below the predetermined threshold;

determining the cost of adding each of said circuit combinations to the network;

determining the circuit combination that costs the least if added to network; and adding circuits to the network in accordance with the circuit combination associated with the lowest cost.

8. The method according to claim 7, wherein the step of determining a plurality of circuit combinations further comprises the step of:

determining the number of circuits required at each link within the combination so that the network blocking probability falls below the predetermined threshold.

9. The method according to claim 8, wherein the step of determining the number of circuits required at each link further comprises the steps of:

determining the network blocking probability with a fixed amount of additional circuits at each link;

incrementing said fixed amount of additional circuits at each link if said network blocking probability determination is not less than the predetermined threshold; and repeating said network blocking probability determination step and said circuit increment step until the network probability threshold is less than the predetermined threshold.

10. The method according to claim 9, wherein the step of determining the network blocking probability further comprises the steps of:

determining the rates of call arrival for respective links;

estimating state probability distributions for respective links using said call arrival rates and based on approximations of said link state probability distributions to correspond to a continuous probability function;

calculating a path assignment probability that an arrived call is assigned to a particular path based upon said estimated state probability distributions; and determining the network blocking probability based upon the path assignment probability.

11. An apparatus for determining a network blocking probability in a communication network, the communication network having nodes connected to each other by links, the links which interconnect the originating and terminating nodes defining a path, the apparatus comprising:

means for determining the rates of call arrival for respective links;

means for estimating state probability distributions for respective links using said call arrival rates and based on approximations of said link state probability distributions to correspond to a continuous probability function;

means for calculating a path assignment probability based upon the estimated state probability distributions; and means for determining the network blocking probability based upon the path assignment probability.

12. The apparatus according to claim 11, wherein the means for estimating comprises:

means for determining, for each link, values of $\mu$ and $\sigma$ corresponding to a Gaussian curve substantially matching the state probability distribution for the respective link.

13. The apparatus according to claim 12, wherein the means for determining values of $\mu$ and $\sigma$ comprises:

means for assigning arbitrary values to $\mu$ and $\sigma$;

means for calculating that a state probability distribution associated with each respective link is greater than a predetermined amount based on values of $\mu$ and $\sigma$;

means for calculating a path assignment probability that an arrived call is assigned to a particular path based upon the state distribution probability;

means for determining a call arrival rate and a call departure rate for each link based upon the path assignment probability;

means for calculating new values of $\mu$ and $\sigma$ for each link based upon the respective call arrival rate and the respective call departure rate; and means for determining whether the difference between the new values of $\mu$ and $\sigma$ and previous values of $\mu$ and $\sigma$ is less than a predetermined amount.

14. The apparatus according to claim 12, wherein the means for determining values of $\mu$ and $\sigma$ comprises:

means for setting a value for $\rho$ for each link;

means for assigning an arbitrary value to $\mu$ for each link;

means for determining the value of $\sigma$ to be $(\mu*\rho)^{1/2}$ for respective links;

means for calculating a probability that a cost of a particular path, for each origin—destination pair of nodes, is greater than a predetermined amount based upon link cost probability;

means for calculating, for each link, a probability that a cost of each respective link is greater than a predetermined amount based upon the values of $\mu$ and $\sigma$;

means for calculating a probability that an arrived call is assigned to a particular path based on the path cost probability;

means for determining the new value of $\mu$ for each link to minimize the difference between a total carried load for the respective link and the average value of the Gaussian distribution that approximate the state distribution for the link; and means for determining whether the difference between the new value of $\mu$ for each link and the previous value of $\mu$ is less than a predetermined amount.

* * * * *